United States Patent
Sun et al.

(10) Patent No.: US 12,481,735 B2
(45) Date of Patent: Nov. 25, 2025

(54) DATA ASSET SHARING BETWEEN ACCOUNTS AT A DATA PROCESSING SERVICE USING CLOUD TOKENS

(71) Applicant: Databricks, Inc., San Francisco, CA (US)

(72) Inventors: Xiaotong Sun, Mountain View, CA (US); Abhijit Chakankar, San Jose, CA (US); Ramesh Chandra, Sunnyvale, CA (US)

(73) Assignee: Databricks, Inc., San Francisco, CA (US)

( * ) Notice: Subject to any disclaimer, the term of this patent is extended or adjusted under 35 U.S.C. 154(b) by 270 days.

(21) Appl. No.: 18/491,500

(22) Filed: Oct. 20, 2023

(65) Prior Publication Data

US 2025/0131070 A1    Apr. 24, 2025

(51) Int. Cl.
*G06F 21/31* (2013.01)

(52) U.S. Cl.
CPC .................................. *G06F 21/31* (2013.01)

(58) Field of Classification Search
CPC ....................................................... G06F 21/31
See application file for complete search history.

(56) References Cited

U.S. PATENT DOCUMENTS

| | | | | |
|---|---|---|---|---|
| 8,725,963 B1 * | 5/2014 | Emelianov | .............. | G06F 12/08 711/6 |
| 8,892,677 B1 * | 11/2014 | Grove | ..................... | G06F 16/21 709/219 |
| 9,032,081 B1 * | 5/2015 | North | .................. | H04L 67/1006 709/227 |
| 9,588,977 B1 * | 3/2017 | Wang | ...................... | G06F 16/13 |
| 9,727,470 B1 * | 8/2017 | Cande | ..................... | G06F 3/067 |
| 9,898,477 B1 * | 2/2018 | Panghal | ............... | G06F 16/182 |
| 10,079,842 B1 * | 9/2018 | Brandwine | ......... | H04L 63/1441 |
| 10,109,003 B1 * | 10/2018 | Jenkins | .............. | G06Q 30/0633 |
| 10,515,212 B1 * | 12/2019 | McClintock | ............ | G06F 21/57 |
| 10,817,280 B1 * | 10/2020 | Masrani | .................... | G06F 8/30 |
| 10,915,497 B1 * | 2/2021 | Bono | .................... | G06F 16/185 |
| 10,936,494 B1 * | 3/2021 | Panghal | ............... | H04L 67/568 |
| 11,093,442 B1 * | 8/2021 | Bhutani | ............... | G06F 16/119 |
| 11,204,715 B1 * | 12/2021 | Fawcett | ............... | G06F 3/0617 |
| 11,431,497 B1 * | 8/2022 | Liguori | ................ | H04L 9/0897 |

(Continued)

*Primary Examiner* — Aravind K Moorthy
(74) *Attorney, Agent, or Firm* — Fenwick & West LLP

(57) ABSTRACT

A data processing service receives indication that a recipient will request access to data assets of a provider and provides a request for credentials from a recipient governance module. The recipient governance module stores a recipient metastore including an object for a provider metastore. In response to determining that the assets are associated with the provider metastore, the service provides a request for credentials to a provider governance module. The provider governance module stores the provider metastore describing data assets of the provider and permissions for accessing data assets. The provider metastore includes a recipient object attached to the data assets with an identifier for the recipient metastore. In response to verifying that the recipient was provided access to the data assets, the service provides a token to the recipient governance module. The service then provides the token to a computing resource to provide access to the data assets.

20 Claims, 6 Drawing Sheets

(56) References Cited

U.S. PATENT DOCUMENTS

| | | | | |
|---|---|---|---|---|
| 11,640,410 | B1* | 5/2023 | Zulak | G06F 16/2358 707/626 |
| 11,785,280 | B1* | 10/2023 | Dakss | H04N 21/43079 725/37 |
| 12,182,014 | B2* | 12/2024 | Monteith | G06F 16/188 |
| 2005/0044148 | A1* | 2/2005 | Son | G06F 9/541 709/205 |
| 2011/0023018 | A1* | 1/2011 | Park | G06F 9/465 717/121 |
| 2014/0019753 | A1* | 1/2014 | Lowry | H04L 9/0894 713/155 |
| 2014/0344327 | A1* | 11/2014 | Lovric | G06Q 30/00 709/203 |
| 2017/0286698 | A1* | 10/2017 | Shetty | H04L 67/10 |
| 2018/0146037 | A1* | 5/2018 | Figueroa | H04L 67/1097 |
| 2018/0336079 | A1* | 11/2018 | Soman | G06F 9/548 |
| 2019/0132120 | A1* | 5/2019 | Zhang | H04L 63/0428 |
| 2020/0134215 | A1* | 4/2020 | Natanzon | G06F 3/067 |
| 2020/0234375 | A1* | 7/2020 | Natanzon | G06F 21/645 |
| 2020/0287718 | A1* | 9/2020 | Hildebrand | H04L 67/1061 |
| 2020/0410018 | A1* | 12/2020 | Gao | G06F 16/958 |
| 2021/0109818 | A1* | 4/2021 | Perneti | G06F 11/324 |
| 2021/0109862 | A1* | 4/2021 | Yang | G06F 13/1668 |
| 2021/0132811 | A1* | 5/2021 | Puvvada | G06F 16/273 |
| 2021/0258329 | A1* | 8/2021 | Clayton | H04L 63/1416 |
| 2021/0294679 | A1* | 9/2021 | Thakur | G06F 8/315 |
| 2021/0314402 | A1* | 10/2021 | Seshadri | G06F 16/13 |
| 2021/0360401 | A1* | 11/2021 | Marinho | H04L 45/02 |
| 2022/0028193 | A1* | 1/2022 | Ehlert | G16H 40/20 |
| 2022/0058164 | A1* | 2/2022 | Thakur | G06F 16/248 |
| 2022/0100715 | A1* | 3/2022 | Lee | G06F 16/258 |
| 2022/0198070 | A1* | 6/2022 | Hunt | G06F 21/53 |
| 2022/0283724 | A1* | 9/2022 | Malamut | G06F 3/0619 |
| 2022/0287089 | A1* | 9/2022 | Singh | H04L 63/10 |
| 2022/0391748 | A1* | 12/2022 | Nikitin | G06N 20/00 |
| 2022/0400103 | A1* | 12/2022 | Jafri | H04L 63/0838 |
| 2023/0121460 | A1* | 4/2023 | Banerjee | G06F 16/27 707/812 |
| 2023/0185774 | A1* | 6/2023 | Brand | G06F 16/13 707/827 |
| 2023/0237177 | A1* | 7/2023 | Kwatra | G06F 21/6218 726/1 |
| 2023/0239348 | A1* | 7/2023 | Padmanabhan | H04L 9/50 709/203 |
| 2023/0353568 | A1* | 11/2023 | Denny-Brown | H04L 63/0884 |
| 2023/0401332 | A1* | 12/2023 | Vahidnia | H04L 63/101 |
| 2023/0403279 | A1* | 12/2023 | Gnanaprakasam | H04L 63/126 |
| 2024/0020206 | A1* | 1/2024 | Arai | G06F 11/1464 |
| 2024/0378118 | A1* | 11/2024 | Chis | G06F 11/1461 |
| 2024/0385598 | A1* | 11/2024 | Nookala | G05B 19/4183 |
| 2024/0403093 | A1* | 12/2024 | Yang | G06F 3/067 |
| 2024/0420180 | A1* | 12/2024 | Qu | G06Q 30/0201 |
| 2024/0422192 | A1* | 12/2024 | Patrick, II | H04L 63/145 |
| 2025/0004665 | A1* | 1/2025 | Busick | G06F 3/0622 |
| 2025/0021437 | A1* | 1/2025 | Juneja | G06F 11/1484 |
| 2025/0061090 | A1* | 2/2025 | Khobragade | G06F 16/1737 |
| 2025/0086017 | A1* | 3/2025 | Schworer | G06F 9/5038 |

\* cited by examiner

600

```
┌─────────────────────────────────────────────┐
│ Receive indication that a recipient will    │
│ request access to shared data assets of a   │
│ provider                                    │
│ 602                                         │
└─────────────────────────────────────────────┘
                      ↓
┌─────────────────────────────────────────────┐
│ Provide, to a first data governance module  │
│ for the recipient that includes a recipient │
│ metastore, a request to generate temporary  │
│ credentials                                 │
│ 604                                         │
└─────────────────────────────────────────────┘
                      ↓
┌─────────────────────────────────────────────┐
│ Determine that the shared assets are        │
│ associated with a provider metastore        │
│ 606                                         │
└─────────────────────────────────────────────┘
                      ↓
┌─────────────────────────────────────────────┐
│ Provide, to a second data governance module │
│ that includes the provider metastore, a     │
│ request to generate the temporary           │
│ credentials                                 │
│ 608                                         │
└─────────────────────────────────────────────┘
                      ↓
┌─────────────────────────────────────────────┐
│ Verify that the recipient has access to the │
│ shared data assets                          │
│ 610                                         │
└─────────────────────────────────────────────┘
                      ↓
┌─────────────────────────────────────────────┐
│ Provide, by the second data governance      │
│ module, an access token to the first data   │
│ governance module                           │
│ 612                                         │
└─────────────────────────────────────────────┘
                      ↓
┌─────────────────────────────────────────────┐
│ Provide, by the first data governance       │
│ module, the access token to a computing     │
│ resource such that the computing resource   │
│ accesses the shared data assets using the   │
│ access token for the recipient              │
│ 614                                         │
└─────────────────────────────────────────────┘
```

FIG. 6

DATA ASSET SHARING BETWEEN ACCOUNTS AT A DATA PROCESSING SERVICE USING CLOUD TOKENS

TECHNICAL FIELD

The disclosed configuration relates generally to data asset sharing, and more particularly to sharing data assets between accounts at a data processing service using cloud tokens.

BACKGROUND

A data processing service manages data assets for users associated with different accounts. Often times, entities of the accounts would like to share data assets between one another. Usually there is a separate sharing server and/or sharing protocol for sharing data assets between customers of a data processing service. This might be due to the data processing service needing to address specific security concerns when allowing customers to share data assets between each other. For example, sharing data assets can be achieved via a pre-signed URL. A pre-signed URL uses security credentials to grant time-limited permission to download one or more data assets. The URL can be entered in a browser or used by a program to download the data assets. The credentials used by the pre-signed URL are those of the cloud user who generated the URL and, thus, provide access to the generator's shared data assets. Pre-signed URLs, however, can be problematic because the sharing protocol does not particularly scale well to large tables, and it cannot take advantage of other internal optimizations to the data table provided by the data processing service. Accordingly, to overcome these disadvantages and more, it would be beneficial to implement a sharing protocol that aligns with the data governance protocol of the data processing service, such that a sharing recipient (e.g., the customer a data asset is shared with) is able to obtain a holistic view of the data asset that is not limited by scalability or versioning issues.

BRIEF DESCRIPTION OF THE DRAWINGS

FIG. 6 illustrates a method for sharing data assets between accounts at a data processing service using a cloud token, in accordance with an embodiment.

The figures depict various embodiments of the present configuration for purposes of illustration only. One skilled in the art will readily recognize from the following discussion that alternative embodiments of the structures and methods illustrated herein may be employed without departing from the principles of the configuration described herein.

DETAILED DESCRIPTION

Overview

A data processing service receives an indication that a recipient user of a recipient of the data processing service will request access to one or more shared data assets of a provider user of the data processing service by a computing resource of a cloud infrastructure. The provider user, in this instance, has shared the one or more data assets with the recipient user. In response to receiving the indication, the data processing service provides a request to generate temporary credentials to a first data governance module for the recipient user. The first data governance module stores a recipient metastore that includes a provider object indicating an identifier for a provider metastore of the provider user. In response to determining that the one or more shared assets are associated with the provider user metastore, the data processing service provides a request to generate the temporary credentials to a second data governance module for the provider user. The second data governance module stores the provider user metastore that describes data assets of the provider user along with a set of permissions for accessing the data assets. The provider user metastore includes a recipient object attached to the one or more shared data assets of the provider user that indicates an identifier for the recipient user metastore and other users having access to the one or more shared data assets. In response to verifying that the recipient user was provided access to the one or more shared data assets by the provider user, the second data governance module of the data processing service provides an access token to the first data governance module. In various examples, the access token is a short-lived token. Accordingly, the first data governance module then provides the access token to the computing resource such that the computing resource accesses the one or more shared data assets using the access token.

Data Processing Service System Environment

Figure 1:
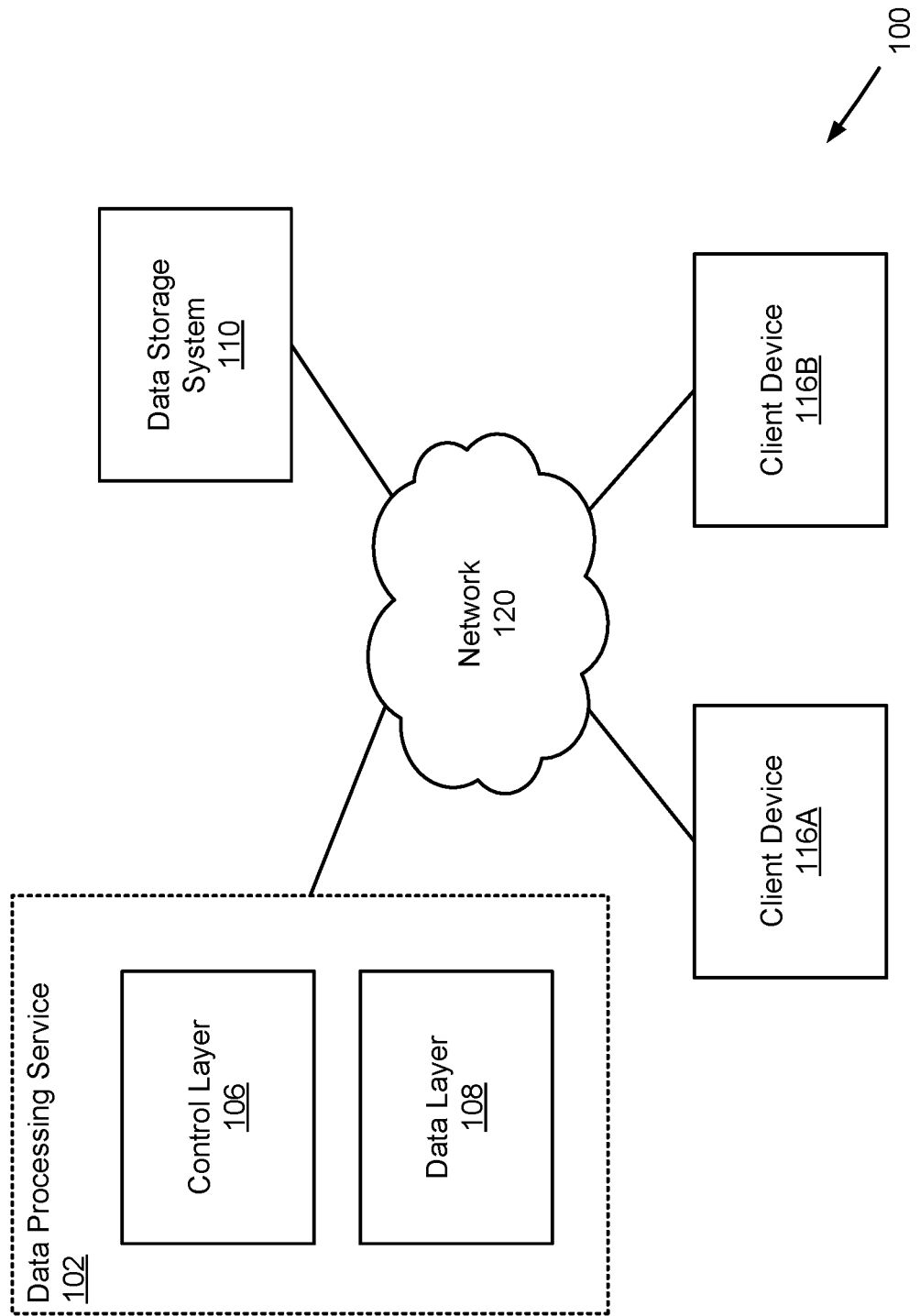
FIG. 1 is a high-level block diagram of a system environment for a data processing service, in accordance with an embodiment.

FIG. 1 is a high-level block diagram of a system environment 100 for a data processing service 102, in accordance with an embodiment. The system environment 100 shown by FIG. 1 includes one or more client devices 116A, 116B, a network 120, a data processing service 102, and a data storage system 110. In alternative configurations, different and/or additional components may be included in the system environment 100.

The data processing service 102 is a service for managing and coordinating data processing services (e.g., database services) to users of client devices 116. The data processing service 102 may manage one or more applications that users of client devices 116 can use to communicate with the data processing service 102. Through an application of the data processing service 102, the data processing service 102 may receive requests (e.g., database queries) from users of client devices 116 to perform one or more data processing functionalities on data stored, for example, in the data storage system 110. The requests may include query requests, analytics requests, or machine learning and artificial intelligence requests, and the like, on data stored by the data storage system 110. The data processing service 102 may provide responses to the requests to the users of the client devices 116 after they have been processed.

In one embodiment, as shown in the system environment 100 of FIG. 1, the data processing service 102 includes a control layer 106 and a data layer 108. The components of the data processing service 102 may be configured by one or more servers and/or a cloud infrastructure platform. In one embodiment, the control layer 106 receives data processing requests and coordinates with the data layer 108 to process the requests from client devices 116. The control layer 106 may schedule one or more jobs for a request or receive requests to execute one or more jobs from the user directly through a respective client device 116. The control layer 106 may distribute the jobs to components of the data layer 108 where the jobs are executed.

The control layer 106 is additionally capable of configuring the clusters in the data layer 108 that are used for executing the jobs. For example, a user of a client device 116 may submit a request to the control layer 106 to perform one or more queries and may specify that four clusters on the data layer 108 be activated to process the request with certain memory requirements. Responsive to receiving this information, the control layer 106 may send instructions to the data layer 108 to activate the requested number of clusters and configure the clusters according to the requested memory requirements.

The data layer 108 includes multiple instances of clusters of computing resources that execute one or more jobs received from the control layer 106. Accordingly, the data layer 108 may include a cluster computing system for executing the jobs. An example of a cluster computing system 402 is described in relation to FIG. 4. In one instance, the clusters of computing resources are virtual machines or virtual data centers configured on a cloud infrastructure platform. In one instance, the data layer 108 is configured such that a plurality of data layer instances process data pertaining to various tenants of the data processing service 102, where a data layer of a respective tenant may reside within its own virtual private cloud (VPC) network. Each tenant's data is isolated and remains invisible to other tenants. For example, a respective data layer instance can be implemented for a respective tenant.

Data layer 108 thus may be accessed by, for example, a developer through an application of control layer 106 to execute code developed by the developer. In one embodiment, a cluster in data layer 108 may include multiple worker nodes that execute multiple jobs in parallel. Responsive to receiving a request, data layer 108 divides the cluster computing job into a set of worker jobs, provides each of the worker jobs to a worker node, receives worker job results, stores job results, and the like. Data layer 108 may include resources not available to a developer on a local development system, such as powerful computing resources to process very large data sets. In this manner, when the data processing request can be divided into jobs that can be executed in parallel, the data processing request can be processed and handled more efficiently with shorter response and processing time.

Data storage system 110 includes a device (e.g., a disc drive, a hard drive, a semiconductor memory) used for storing database data (e.g., a stored data set, portion of a stored data set, data for executing a query). In one embodiment, the data storage system 110 includes a distributed storage system for storing data and may include a commercially provided distributed storage system service. Thus, the data storage system 110 may be managed by a separate entity than an entity that manages the data processing service 102 or the data management system 110 may be managed by the same entity that manages the data processing service 102. In one embodiment, the data storage system 110 includes an authentication service that verifies whether an access request from a cluster computing resource to access one or more data assets (e.g., data tables, metadata) is appropriate based on the trust and permission policies associated with the account associated with the request.

Client devices 116 are computing devices that display information to users and communicates user actions to the systems of the system environment 100. While two client devices 116A, 116B are illustrated in FIG. 1, in practice many client devices 116 may communicate with the systems of the system environment 100. In one embodiment, client device 116 is a conventional computer system, such as a desktop or laptop computer. Alternatively, client device 116 may be a device having computer functionality, such as a personal digital assistant (PDA), a mobile telephone, a smartphone or another suitable device. A client device 116 is configured to communicate via network 120, which may comprise any combination of local area and/or wide area networks, using both wired and/or wireless communication systems.

In one embodiment, a client device 116 executes an application allowing a user of the client device 116 to interact with the various systems of the system environment 100 of FIG. 1. For example, a client device 116 can execute a browser application to enable interaction between the client device 116 and the data processing system 106 via the network 120. In another embodiment, the client device 116 interacts with the various systems of the system environment 100 through an application programming interface (API) running on a native operating system of the client device 116, such as IOS® or ANDROID™.

Figure 2:
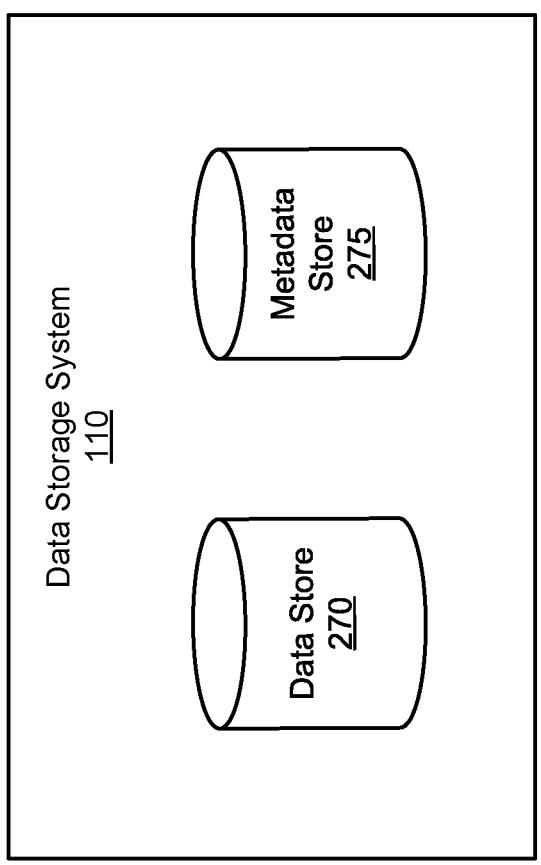
FIG. 2 illustrates a block diagram of an architecture of a data storage system, in accordance with an embodiment.

FIG. 2 is a block diagram of an architecture of a data storage system 108, in accordance with an embodiment. In one embodiment, the data storage system 108 includes a data ingestion module 250. The data storage system 108 also includes a data tables store 270 and a metadata store 275.

The data store 270 stores data associated with different tenants of the data processing service 102. In one embodiment, the data in data store 270 is stored in a format of a data table. A data table may include a plurality of records or instances, where each record may include values for one or more features. The records may span across multiple rows of the data table and the features may span across multiple columns of the data table. In other embodiments, the records may span across multiple columns and the features may span across multiple rows. For example, a data table associated with a security company may include a plurality of records each corresponding to a login instance of a respective user to a website, where each record includes values for a set of features including user login account, timestamp of attempted login, whether the login was successful, and the like. In one embodiment, the plurality of records of a data table may span across one or more data files. For example, a first subset of records for a data table may be included in a first data file and a second subset of records for the same data table may be included in another second data file.

In one embodiment, a data table may be stored in the data store 270 in conjunction with metadata stored in the metadata store 275. In one instance, the metadata includes transaction logs for data tables. Specifically, a transaction log for a respective data table is a log recording a sequence of transactions that were performed on the data table. A transaction may perform one or more changes to the data table that may include removal, modification, and additions of records and features to the data table, and the like. For example, a transaction may be initiated responsive to a request from a user of the client device 116. As another example, a transaction may be initiated according to policies of the data processing service 102. Thus, a transaction may write one or more changes to data tables stored in the data storage system 110.

In one embodiment, a new version of the data table is committed when changes of a respective transaction are successfully applied to the data table of the data storage system 108. Since a transaction may remove, modify, or add data files to the data table, a particular version of the data table in the transaction log may be defined with respect to the set of data files for the data table. For example, a first transaction may have created a first version of a data table defined by data files A and B each having information for a respective subset of records. A second transaction may have then created a second version of the data table defined by data files A, B and in addition, new data file C that includes another respective subset of records (e.g., new records) of the data table.

In one embodiment, the transaction log may record each version of the table, the data files associated with a respective version of the data table, information pertaining to the type of transactions that were performed on the data table, the order in which the transactions were performed (e.g., transaction sequence number, a timestamp of the transaction), and an indication of data files that were subject to the transaction, and the like. In some embodiments, the transaction log may include change data for a transaction that also records the changes for data written into a data table with respect to the previous version of the data table. The change data may be at a relatively high level of granularity and may indicate the specific changes to individual records with an indication of whether the record was inserted, deleted, or updated due to the corresponding transaction.

Figure 3:
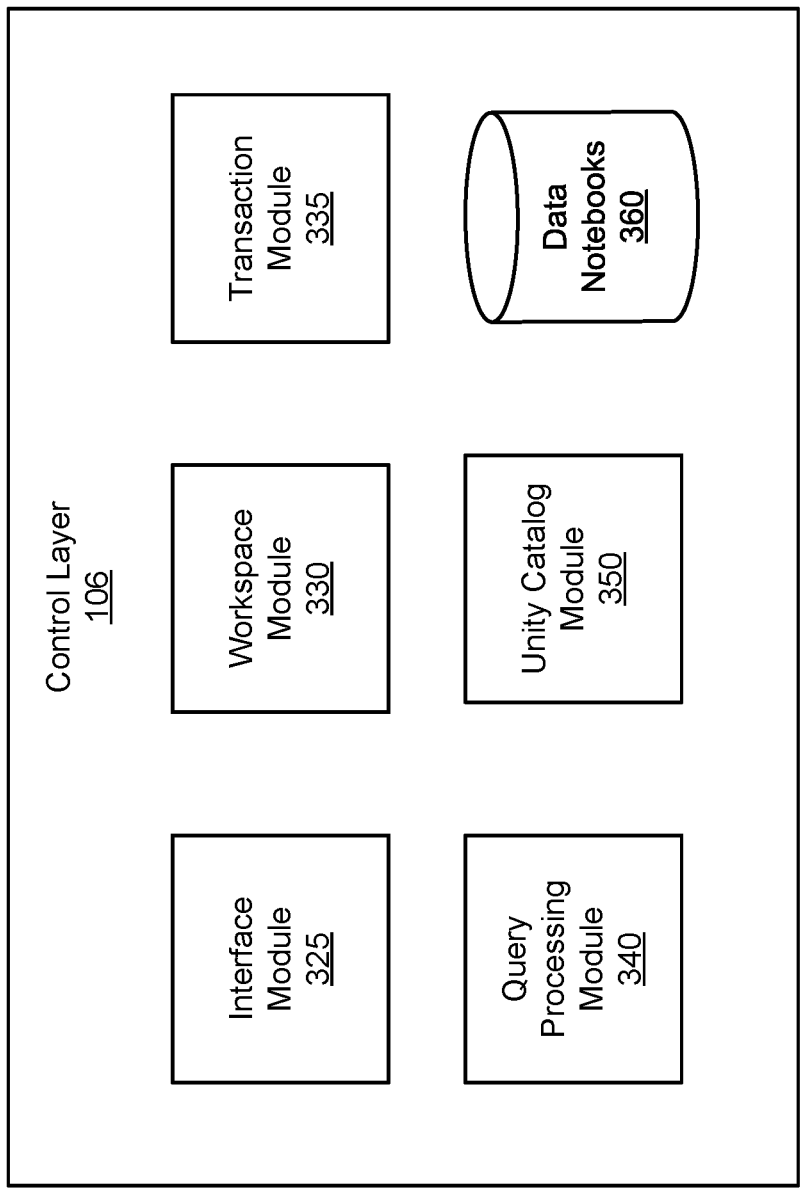
FIG. 3 illustrates a block diagram of an architecture of a control layer, in accordance with an embodiment.

FIG. 3 is a block diagram of an architecture of control layer 106, in accordance with an embodiment. In one embodiment, data processing system 106 includes interface module 325, workspace module 330, transaction module 335, query processing module 340, and cluster management module 345, and unity catalog module 350. The control layer 106 also includes a data notebook store 360.

Interface module 325 provides an interface and/or a workspace environment where users of client devices 116 (e.g., users associated with tenants) can access resources of data processing service 102. For example, the user may retrieve information from data tables associated with a tenant, submit data processing requests such as query requests on the data tables, through the interface provided by interface module 325. The interface provided by interface module 325 may include notebooks, libraries, experiments, queries submitted by the user. In one embodiment, a user may access the workspace via a user interface (UI), a command line interface (CLI), or through an application programming interface (API) provided by workspace module 330.

For example, a notebook associated with a workspace environment is a web-based interface to a document that includes runnable code, visualizations, and explanatory text. A user may submit data processing requests on data tables in the form of one or more notebook jobs. The user provides code for executing the one or more jobs and indications such as the desired time for execution, number of cluster worker nodes for the jobs, cluster configurations, a notebook version, input parameters, authentication information, output storage locations, or any other type of indications for executing the jobs. The user may also view or obtain results of executing the jobs via the workspace.

Workspace module 330 deploys workspaces within data processing service 102. A workspace as defined herein may refer to a deployment in the cloud that functions as an environment for users of the workspace to access assets. An account of data processing service 102 represents a single entity that can include multiple workspaces. In one embodiment, an account associated with data processing service 102 may be associated with one workspace. In another embodiment, an account may be associated with multiple workspaces. A workspace organizes objects, such as notebooks, libraries, dashboards, and experiments into folders. A workspace also provides users access to data objects, such as tables or views or functions, and computational resources such as cluster computing systems.

In one embodiment, a user or a group of users may be assigned to work in a workspace. The users assigned to a workspace may have varying degrees of access permissions to assets of the workspace. For example, an administrator of data processing service 102 may configure access permissions such that users assigned to a respective workspace are able to access all of the assets of the workspace. As another example, users associated with different subgroups may have different levels of access, for example users associated with a first subgroup may be granted access to all data objects while users associated with a second subgroup are granted access to only a select subset of data objects.

Transaction module 335 receives requests to perform one or more transaction operations from users of client devices 116. As described in conjunction in FIG. 2, a request to perform a transaction operation may represent one or more requested changes to a data table. For example, the transaction may be to insert new records into an existing data table, replace existing records in the data table, delete records in the data table. As another example, the transaction may be to rearrange or reorganize the records or the data files of a data table to, for example, improve the speed of operations, such as queries, on the data table. For example, when a particular version of a data table has a significant number of data files composing the data table, some operations may be relatively inefficient. Thus, a transaction operation may be a compaction operation that combines the records included in one or more data files into a single data file.

Query processing module 340 receives and processes queries that access data stored by data storage system 110. Query processing module 340 may reside in control layer 106. The queries processed by query processing module 340 are referred to herein as database queries. The database queries are specified using a declarative database query language such as SQL. Query processing module 340 compiles a database query specified using the declarative database query language to generate executable code that is executed. Query processing module 340 may encounter runtime errors during execution of a database query and returns information describing the runtime error including an origin of the runtime error representing a position of the runtime error in the database query. In one embodiment, query processing module 340 provides one or more queries to appropriate clusters of data layer 108 and receives responses to the queries from clusters in which the queries are executed.

Unity catalog module 350 is a fine-grained data governance solution for managing assets within data processing service 102. Unity catalog module 350 may also be referred to as a data governance module. Unity catalog module 350 helps simplify security and governance by providing a central place to administer and audit data access. In one embodiment, unity catalog module 350 maintains one or more metastores for a respective account. A metastore is a top-level container of objects for the account. The metastore may store data objects and the permissions that govern access to the objects. A metastore for an account can be assigned to one or more workspaces associated with the account. In one embodiment, unity catalog module 350 organizes data as a three-level namespace, a catalogue is the first layer, a schema (also called a database) is the second layer, and tables and views are the third layer.

In one embodiment, unity catalog module 350 enables read and write of data to data stored in cloud storage of the data storage system 110 on behalf of users associated with an account and/or workspace. In one instance, unity catalog module 350 manages storage credentials and external locations. A storage credential represents an authentication and authorization mechanism for accessing data stored on the data storage system 110. Each storage credential may be subject to access-control policies that control which users and groups can access the storage credential and in turn, data assets associated with the storage credential. An external location is an object that combines a cloud storage path (e.g., storage path in the data storage system 110) with a storage credential that authorizes access to the cloud storage path. Each storage location is subject to access-control policies that control which users and groups can access the storage credential. Therefore, if a user does not have access to a storage credential in unity catalog module 350, unity catalog module 350 does not attempt to authenticate to the data storage system 110.

In one embodiment, unity catalog module 350 allows users to share assets of a workspace and/or account with users of other accounts and/or workspaces. For example, users of Company A can configure certain tables owned by Company A that are stored in the data storage system 110 to be shared with users of Company B. Each organization may be associated with separate accounts on the data processing service 102. Specifically, a provider entity can share access to one or more tables of the provider with one or more recipient entities.

Responsive to receiving a request from a provider to share one or more tables (or other data objects), unity catalog module 350 creates a share in the metastore of the provider. A share is a securable object registered in the metastore for a provider. A share contains tables and notebook files or other assets specified in the provider metastore that the provider would like to share with a recipient. A recipient object is an object that associates an organization with a credential or secure sharing identifier allowing that organization to access one or more shares of the provider. In one embodiment, a provider can define multiple recipients for a given metastore. Unity catalog module 350 in turn may create a provider object in the metastore of the recipient that stores information on the provider and the tables that the provider has shared with the recipient. In this manner, a user associated with a provider entity can securely share tables of the provider entity that are stored in a dedicated cloud storage location in the data storage system 110 with users of a recipient entity by configuring shared access in the metastore that will be used by computing cluster resources associated with the recipient entity to access data assets of the provider entity.

Figure 4:
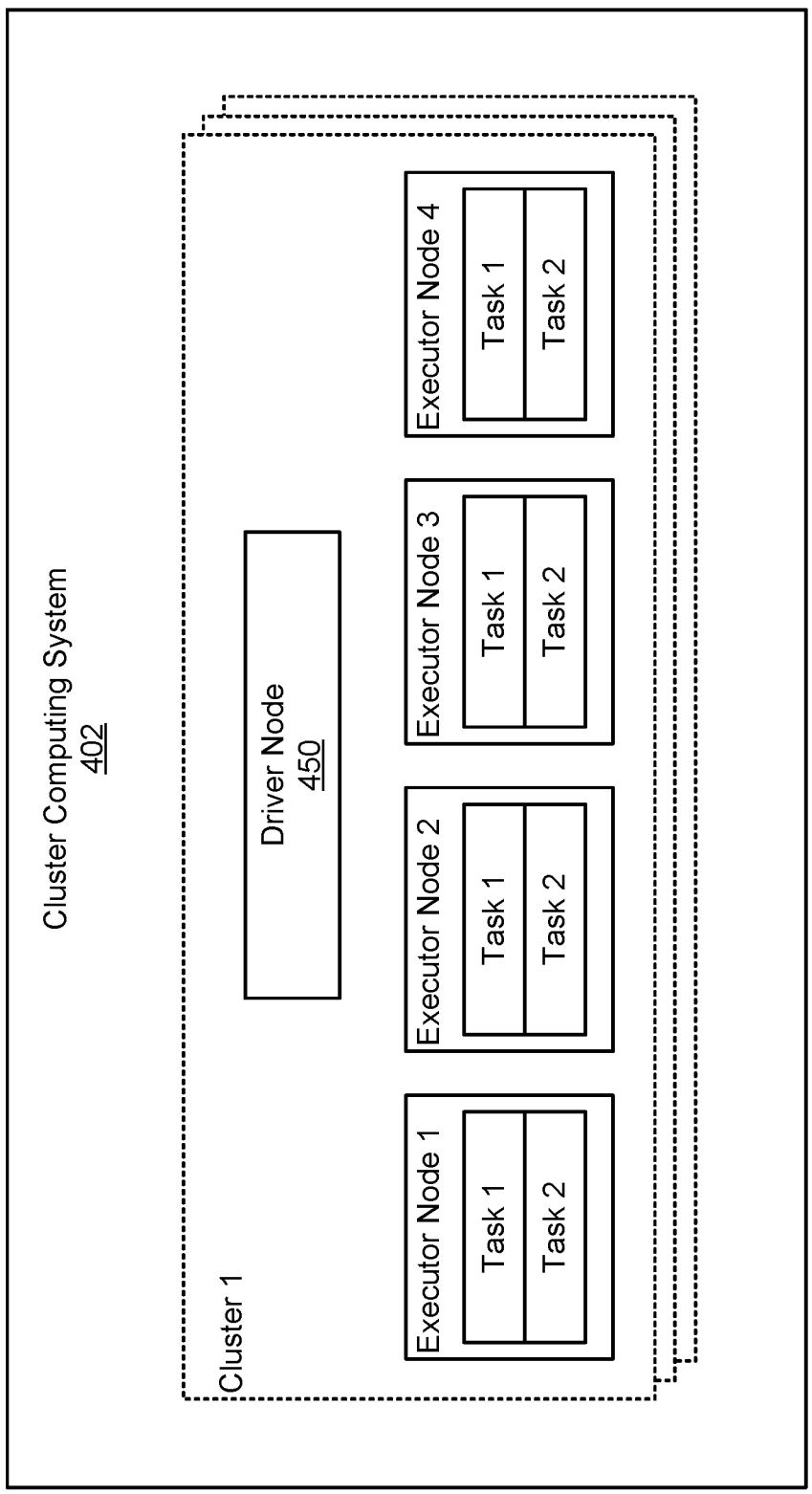
FIG. 4 illustrates a block diagram of an architecture of a cluster computing system of the data layer, in accordance with an embodiment.

FIG. 4 is a block diagram of an architecture of a cluster computing system 402 of the data layer 108, in accordance with an embodiment. In some embodiments, the cluster computing system 402 of the data layer 108 includes driver node 450 and worker pool including multiple executor nodes.

The driver node 450 receives one or more jobs for execution, divides a job into job stages, and provides job stages to executor nodes, receives job stage results from the executor nodes of the worker pool, and assembles job stage results into complete job results, and the like. In one embodiment, the driver node receives a request to execute one or more queries from the query processing module 335. The driver node 450 may compile a database query and generate an execution plan. The driver node 450 distributes the query information including the generated code to the executor nodes. The executor nodes execute the query based on the received information.

The worker pool can include any appropriate number of executor nodes (e.g., 4 executor nodes, 12 executor nodes, 256 executor nodes). Each executor node in the worker pool includes one or more execution engines (not shown) for executing one or more tasks of a job stage. In one embodiment, an execution engine performs single-threaded task execution in which a task is processed using a single thread of the CPU. The executor node distributes one or more tasks for a job stage to the one or more execution engines and provides the results of the execution to the driver node 410. According to an embodiment, an executor node executes the generated code for the database query for a particular subset of data that is processed by the database query. The executor nodes execute the query based on the received information from the driver node 450.

Data Asset Sharing

Figure 5:
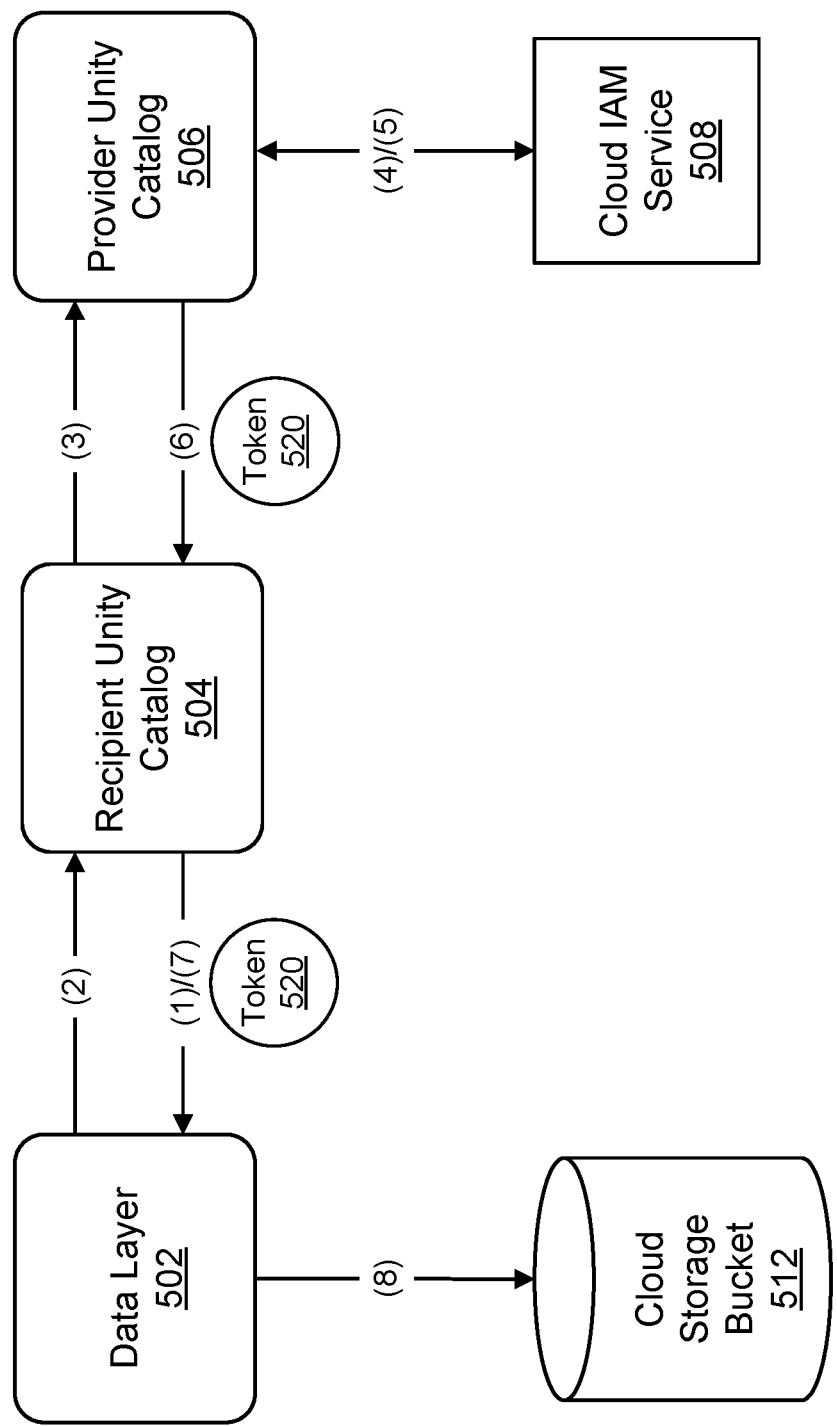
FIG. 5 is a process flow diagram for sharing data assets between accounts at a data processing service using a cloud token, in accordance with an embodiment.

FIG. 5 is a process flow diagram 500 for sharing data assets between accounts of a data processing service 102 using a cloud token, in accordance with an embodiment. In this example, data layer 502 of data processing service 102 receives (1) an indication that a recipient user will request access to one or more shared data assets of a provider user by a computing resource of a cloud infrastructure. In the example shown in FIG. 5, the data layer 502 may include cluster computing resources that reside in the VPC of the recipient entity. Moreover, the request to access the shared data assets may be in the form of a query request (e.g., expressed in SQL) or other forms of requests to perform one or more types of data analytics on the shared data assets. In this example, the recipient user and the provider user are each customers of the data processing service 102. For example, the recipient user could be a first company (or institution, organization, etc.) associated with a first account at data processing service 102 and the provider user could be a second company associated with a second account at data processing service 102 sharing data in the form of data tables, notebooks, and so forth.

In this instance, the provider user has shared one or more data assets with the recipient user. From the perspective of data processing service 102, data processing service 102 receives a share request from the provider user to share the one or more shared data assets with the recipient user as described in conjunction with the unity catalog module 350 of FIG. 3. In response, data processing service 102 creates a share object and stores it in provider unity catalog 506. Thus, in response to receiving the indication (1), data processing service 102 provides (2) a request to recipient unity catalog 504 to generate temporary credentials. Recipient unity catalog 504 includes the share object from the provider user that identifies provider unity catalog 506 of the provider user. Upon confirming and in response to determining that the one or more shared assets are associated with provider unity catalog 506, data processing service 102 provides (3) a request to generate the temporary credentials to provider unity catalog 506 for the provider user.

Provider unity catalog 506 describes data assets of the provider user along with a set of permissions for accessing the data assets. In this instance, since the provider user has shared the one or more data assets with the provider user, provider unity catalog 506 includes a recipient object that is attached to the one or more shared data assets of the provider user to indicate that the recipient user has been granted access to those data assets. The recipient object, in this instance, includes an identifier for recipient unity catalog 504, as well as any other users that have access to those shared data assets.

The provider unity catalog 506 may verify that the recipient of the request has access to the shared data assets by verifying, for example, the external location and storage credentials associated with the data assets. In response to verifying that the recipient user was provided access to the shared data assets by the provider user, provider unity catalog 506 identifies the corresponding location of the one or more shared data assets and makes a call (4) to the appropriate cloud identity and access management (IAM) service 508 to request access token 502. In one instance, the call may be an application programming interface (API) call to the cloud IAM service 508. The IAM service 508 may be a service deployed by a cloud provider, and may include a token generation service that generates the access tokens responsive to receiving an access request. In one embodiment, access token 502 is a short-lived access token that allows the recipient user to access a piece of a storage location in a S3 bucket as hosted data of the provider user. Accordingly, provider unity catalog 506 receives (5) access token 502 from cloud IAM service 508 and provides (6) access token 502 to recipient unity catalog 504. Accordingly, recipient unity catalog 504 then provides (7) access token 502 to data layer 502 that then uses access token 502 to access the one or more shared data assets on behalf of the recipient user.

For example, the data layer 502 of the recipient user may access one or more shared data assets from the cloud storage bucket 512 that may be stored within the data store or metadata store of the data storage system 110 associated with the provider user. Responsive to verification by the authentication service, the data layer 502 can access the shared data assets such that the data can be used to execute data processing operations.

Specifically, another way data assets of the provider user can be shared with the recipient user is via pre-signed URL's. However, since the pre-signed URL's may be generated for each data file of a data table, the load on the sharing server or unity catalog module is approximately linear to the size of the data table due to the reading of metadata files (e.g., checkpoint files) and signing the files of the data table. This may result in significant latencies when, for example, a data table is composed of millions of data files. By granting access to shared data assets at a directory-level in cloud object storage using the process of FIG. 5, performance and scalability limitations may be eliminated or significantly reduced. In addition, the data processing service 102 may apply various types of internal optimizations to the data table (and the data files that make up the data table) in the data storage system 110 of the provider entity, that the recipient entity cannot take advantage of when accessing the data via pre-signed URL's. By the process of FIG. 5, the cluster computing resource of the data layer 108 of the recipient user is able to take advantage of these internal optimizations, further providing a higher level of efficiency and speedup.

Method for Sharing Data Assets Using a Cloud Token

FIG. 6 illustrates a method for sharing data assets between accounts at data processing service 102 using a cloud token, in accordance with an embodiment. The process shown in FIG. 6 may be performed by one or more components (e.g., the control layer 106) of a data processing system/service (e.g., the data processing service 102). Other entities may perform some or all of the steps in FIG. 6. Embodiments may include different and/or additional steps, or perform the steps in different orders.

Data processing service receives 602 an indication that a recipient user of a recipient of data processing service 602 will request access to one or more shared data assets of a provider user of data processing service 602. The provider user, in this instance, has shared the one or more data assets with the recipient user.

Data processing service 102 provides 604 a request to generate temporary credentials to a first data governance module for the recipient user in response to receiving the indication. The first data governance module stores a recipient metastore that includes a provider object indicating an identifier for a provider metastore of the provider user. In one embodiment, the indication that the recipient user will request access to the one or more shared data assets of the provider user is received by data processing service 102 in response to receiving a share request from the provider user to the data assets with the provider user. In one embodiment, the share request creates a share object in the provider metastore indicated credentials for the recipient user to access the shared data assets. In one embodiment, the share object is forwarded to the recipient metastore and stored therein as the provider object.

Data processing service 102, in this example, determines 606 that the one or more shared assets are associated with the provider user metastore and provides 608 a request to generate the temporary credentials to a second data governance module for the provider user. The second data governance module stores the provider user metastore that describes data assets of the provider user along with a set of permissions for accessing the data assets. The provider user metastore includes a recipient object attached to the one or more shared data assets of the provider user that indicates an identifier for the recipient user metastore and other users having access to the one or more shared data assets.

Accordingly, data processing service 102 verifies 610 that the recipient user was provided access to the one or more shared data assets by the provider user and the second data governance module provides 612 an access token to the first data governance module. In one embodiment, the second data governance module identifies the corresponding location of the one or more shared data assets and makes a call to the appropriate cloud IAM service to request an access token that allows the recipient user to access a piece of a storage location in a S3 bucket where the one or more data assets are stored. Accordingly, the first data governance module then provides 612 the access token to the computing resource such that the computing resource accesses the one or more shared data assets using the access token to provide the recipient user with access to the shared data assets.

SUMMARY

The foregoing description of the embodiments of the disclosed subject matter have been presented for the purpose of illustration; it is not intended to be exhaustive or to limit the disclosed embodiments to the precise forms disclosed. Persons skilled in the relevant art can appreciate that many modifications and variations are possible in light of the disclosed subject matter.

Some portions of this description describe various embodiments of the disclosed subject matter in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosed subject matter may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the present disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosed embodiments be limited not by this detailed description, but rather by any claims that issue on an application based hereon. Accordingly, the disclosure of the embodiments of the disclosed subject matter is intended to be illustrative, but not limiting, of the scope of the subject matter, which is set forth in the following claims.

What is claimed is:

1. A method, comprising:
receiving an indication that a recipient user of a data processing service will request access to one or more shared data assets of a provider user of the data processing service by a computing resource of a cloud infrastructure;
providing, to a first data governance module for the recipient user, a request to generate temporary credentials, the first data governance module storing a recipient metastore, wherein the recipient metastore includes a provider object for the provider user indicating an identifier for a provider metastore associated with the provider user;
responsive to determining that the one or more shared assets are associated with the provider metastore, providing, to a second data governance module for the provider user, a request to generate the temporary credentials, the second data governance module storing a provider metastore, the provider metastore describing data assets of the provider user, wherein the provider metastore includes a recipient object attached to the one or more shared data assets of the provider user indicating an identifier for the recipient metastore;
responsive to verifying that the user has access to the one or more shared data assets, providing, by the second data governance module, an access token to the first data governance module; and
providing, by the first data governance module, the access token to the computing resource such that the computing resource accesses the one or more shared data assets using the access token.

2. The method of claim 1, further comprising:
receiving, from the provider user, a share request to share the one or more shared data assets with the recipient user; and
responsive to receiving the share request, creating the recipient object in the provider metastore.

3. The method of claim 2, wherein the indication that the recipient user will request access to the one or more shared data assets of the provider user is received by the data processing service in response to receiving the share request.

4. The method of claim 1, wherein the access token is a short-lived temporary token.

5. The method of claim 1, wherein the second data governance module for the provider:
identifies a storage location associated with the one or more shared data assets; and
requests the access token from a corresponding cloud identity and access management (IAM) service of a cloud provider based on the storage location.

6. The method of claim 1, wherein the access token provides the recipient user access to the one or more data assets stored in cloud object storage.

7. The method of claim 1, wherein the recipient user is a first entity with a first account at the data processing service and the provider user is a second entity with a second account at the data processing service.

8. A non-transitory computer readable storage medium storing instructions that, when executed by one or more computer processors, causes the one or more computer processors to:
receive an indication that a recipient user of a data processing service will request access to one or more shared data assets of a provider user of the data processing service by a computing resource of a cloud infrastructure;
provide, to a first data governance module for the recipient user, a request to generate temporary credentials, the first data governance module storing a recipient metastore, wherein the recipient metastore includes a provider object for the provider user indicating an identifier for a provider metastore associated with the provider user;
responsive to determining that the one or more shared assets are associated with the provider metastore, provide, to a second data governance module for the provider user, a request to generate the temporary credentials, the second data governance module storing a provider metastore, the provider metastore describing data assets of the provider user, wherein the provider metastore includes a recipient object attached to the one or more shared data assets of the provider user indicating an identifier for the recipient metastore;

responsive to verifying that the user has access to the one or more shared data assets, provide, by the second data governance module, an access token to the first data governance module; and provide, by the first data governance module, the access token to the computing resource such that the computing resource accesses the one or more shared data assets using the access token.

9. The non-transitory computer readable storage medium of claim 8, wherein the instructions that, when executed by the one or more computer processors, further causes the one or more computer processors to:

receive, from the provider user, a share request to share the one or more shared data assets with the recipient user; and responsive to receiving the share request, create the recipient object in the provider metastore.

10. The non-transitory computer readable storage medium of claim 9, wherein the indication that the recipient user will request access to the one or more shared data assets of the provider user is received by the data processing service in response to receiving the share request.

11. The non-transitory computer readable storage medium of claim 8, wherein the access token is a short-lived temporary token.

12. The non-transitory computer readable storage medium of claim 8, wherein the second data governance module for the provider:

identifies a storage location associated with the one or more shared data assets; and requests the access token from a corresponding cloud identity and access management (IAM) service of a cloud provider based on the storage location.

13. The non-transitory computer readable storage medium of claim 8, wherein the access token provides the recipient user access to the one or more data assets stored in cloud object storage.

14. The non-transitory computer readable storage medium of claim 8, wherein the recipient user is a first entity with a first account at the data processing service and the provider user is a second entity with a second account at the data processing service.

15. A computer system comprising:

a computer processor; and a non-transitory computer readable storage medium storing instructions that, when executed by one or more computer processors, causes the one or more computer processors to:

receive an indication that a recipient user of a data processing service will request access to one or more shared data assets of a provider user of the data processing service by a computing resource of a cloud infrastructure;

provide, to a first data governance module for the recipient user, a request to generate temporary credentials, the first data governance module storing a recipient metastore, wherein the recipient metastore includes a provider object for the provider user indicating an identifier for a provider metastore associated with the provider user;

responsive to determining that the one or more shared assets are associated with the provider metastore, provide, to a second data governance module for the provider user, a request to generate the temporary credentials, the second data governance module storing a provider metastore, the provider metastore describing data assets of the provider user, wherein the provider metastore includes a recipient object attached to the one or more shared data assets of the provider user indicating an identifier for the recipient metastore;

responsive to verifying that the user has access to the one or more shared data assets, provide, by the second data governance module, an access token to the first data governance module; and provide, by the first data governance module, the access token to the computing resource such that the computing resource accesses the one or more shared data assets using the access token.

16. The computing system of claim 15, wherein the instructions that, when executed by the one or more computer processors, further causes the one or more computer processors to:

receive, from the provider user, a share request to share the one or more shared data assets with the recipient user; and responsive to receiving the share request, create the recipient object in the provider metastore.

17. The computing system of claim 16, wherein the indication that the recipient user will request access to the one or more shared data assets of the provider user is received by the data processing service in response to receiving the share request.

18. The computing system of claim 15, wherein the access token is a short-lived temporary token.

19. The computing system of claim 15, wherein the second data governance module for the provider:

identifies a storage location associated with the one or more shared data assets; and requests the access token from a corresponding cloud identity and access management (IAM) service of a cloud provider based on the storage location.

20. The computing system of claim 15, wherein the access token provides the recipient user access to the one or more data assets stored in cloud object storage.

* * * * *

UNITED STATES PATENT AND TRADEMARK OFFICE
CERTIFICATE OF CORRECTION

PATENT NO. : 12,481,735 B2  Page 1 of 1
APPLICATION NO. : 18/491500
DATED : November 25, 2025
INVENTOR(S) : Sun et al.

It is certified that error appears in the above-identified patent and that said Letters Patent is hereby corrected as shown below:

In the Claims

In Column 14, in Claim 16, Line 27, delete "computing" and insert -- computer --, therefor.

In Column 14, in Claim 17, Line 36, delete "computing" and insert -- computer --, therefor.

In Column 14, in Claim 18, Line 41, delete "computing" and insert -- computer --, therefor.

In Column 14, in Claim 19, Line 43, delete "computing" and insert -- computer --, therefor.

In Column 14, in Claim 20, Line 50, delete "computing" and insert -- computer --, therefor.

Signed and Sealed this
Twenty-seventh Day of January, 2026

John A. Squires
*Director of the United States Patent and Trademark Office*